3,066,121
HYDROLYSIS OF POLYVINYL ESTERS
Eugene C. Martin, Texas City, and Joseph F. Jennings, Galveston, Tex., assignors, by mesne assignments, to Standard Oil Company of Chicago, a corporation of Indiana
No Drawing. Filed July 3, 1959, Ser. No. 824,780
8 Claims. (Cl. 260—91.3)

This invention relates to the preparation of polyvinyl alcohol by the hydrolysis (more accurately but less frequently termed alcoholysis) of polyvinyl esters. More particularly, the invention provides a novel process for preparing exceptionally homogeneous polyvinyl alcohol solutions.

Polyvinyl alcohol is conventionally prepared by the hydrolysis of polyvinyl acetate, employing a lower alkanol such as methanol for the hydrolysis and an alkaline catalyst such as guanidine carbonate. Existing commercial operations are largely centered around the Berg process (U.S. 2,227,997; Can. 395,216; G.B. 512,001), which involves forming a plastic or doughy mass from a polyvinyl ester such as polyvinyl acetate and an alkanol, and mechanically kneading the mass until the desired hydrolysis takes place. This procedure, while in common use, suffers the important disadvantages of yielding an inhomogeneous and non-uniform product (U.S. 2,605,259). Recently, attempts have been made to control the hydrolysis by employing various amounts of water (e.g. U.S. 2,109,883; U.S. 2,227,997; U.S. 2,341,398; B.P. 563,991). The most recent development (U.S. 2,640,816) employs from 12 to 20 weight percent water during the reaction, and while control is somewhat improved, the patentee discloses that "the presence of these large amounts of water makes it necessary to use larger amounts of catalyst." Unfortunately, as pointed out in U.S. 2,109,883, large amounts of catalyst complicate the final purification of polyvinyl ester-alcohol products.

Accordingly, a primary object of the present invention is to provide a procedure for the controlled hydrolysis of polyvinyl esters to polyvinyl alcohols which permits precise and reproducible operation of the process without involving the need for excess catalyst. A further object is to provide a process which eliminates the high power requirements of mechanical kneading. Other and more particular objects will become apparent as the description of the invention proceeds in detail.

Briefly, and in accordance with the invention, we hydrolyze polyvinyl esters with lower alkanols in the presence of alkaline hydrolysis catalysts by a multi-step procedure. First, the ester and catalyst are co-mingled with an excess of the alkanol to form a fluid reaction mixture. This mixture is initially substantially free of water, and contains less than five and preferably much less than 1% of water based on total reactants. The hydrolysis reaction is then permitted to proceed in the substantial absence of water until sufficient polyvinyl alcohol is produced to form a rather weak gel with the excess alcohol. Immediately after the weak gel is formed, water is introduced into the mixture. This breaks the gel and returns the reaction mixture into a fluid state, which then is permitted to react further until the desired degree of hydrolysis is produced.

Polyvinyl alcohol produced by the inventive procedure is almost completely homogeneous in composition and degree of hydrolysis, and accordingly the expensive polyvinyl alcohol fractionation procedures which have been essential in the prior art to prepare uniform polyvinyl alcohol products are obviated entirely. Furthermore, power requirements for kneading are eliminated, and are replaced by a simple low-powered fluid agitator. Also, the amount of catalyst which is required is no more than that which had been employed in the prior art Berg-type hydrolysis.

The polyvinyl esters which may be employed herewith are predominately esters of low molecular weight fatty acids, such as acetic or propionic acids. Commercially, polyvinyl acetate is most important, as vinyl acetate monomer is readily prepared by reacting acetic acid with acetylene.

The lower alkanols are low molecular weight saturated alcohols preferably having from about 1 to 4 carbon atoms per molecule. Methanol is most commonly employed, but ethanol, the propanols, and the butanols may be substituted in whole or in part for methanol. The amount of alkanol may range from 1 mol per equivalent of ester to 15 mols, depending on the temperature; the necessary requirement is that sufficient alkanol be used to provide a fluid reaction mixture.

Hydrolysis catalysts are of the alkaline type, and generally are well known in the art. Alkali metal hydroxides such as sodium hydroxide or potassium hydroxide may be employed, but it has been found that superior control has been achieved when the catalyst is a weakly basic alcohol-soluble catalyst such as sodium methoxide or potassium methoxide. Perhaps the most suitable catalyst is guanidine carbonate.

It has been discovered that the amount of catalyst which is used exerts an important effect on the extent of hydrolysis; increasing the catalyst concentration increases the degree of hydrolysis. The amount of catalyst may range from 0.001 to 0.3 part by weight per part of polyvinyl ester.

Reaction conditions for the hydrolysis reaction are not critical, and may be carried out over a wide range of temperatures, e.g. from about 10° C. to 60° C., more desirably between 10° C. and 40° C., optimally between about 20° C. and 30° C. During the reaction, agitation of the mixture by such means as rotary stirrers or recirculating pumps is desirable.

After commencement of the hydrolysis reaction, the reaction mixture slowly increases in viscosity over a period of 10–200 minutes. After a period of time, depending on the temperature and catalyst concentration, the solution will start to rapidly gel and if nothing further is added to the reaction mixture a stiff gel will form in about 2 to 6 minutes. When the gel first forms, however, water is introduced into the reaction mixture to disrupt the gel and return the solution to its original fluid state. Introduction is best completed within a minute or so after the gel starts to form and before gelation progresses to a thick consistency so as to avoid an otherwise difficult mixing problem. The amount of water should be in excess of that required to form sufficient acetic acid so as to react with and neutralize the hydrolysis catalyst. The minimum amount may readily be computed on the basis that one equivalent of catalyst is neutralized by one mol of acetic acid, which in turn is formed by one mol of water. However, the amount of water added should be sufficient so that the reaction mixture will remain in the fluid state throughout the hydrolysis reaction. This will be controlled by the degree of hydrolysis desired. Optimum practice involves the use of from 0.1 part to 15 parts of water per part of polymer.

Once the gel is disrupted, the reaction may be continued for an additional period ranging from 1 to 8 hours or more, usually about 3 hours. This is for the purpose of increasing the extent of hydrolysis while, at the same time, permitting controlled destruction of the catalyst.

The invention will be more fully understood by reference to the following examples, wherein a series of seven runs was made at catalyst concentrations ranging from 0.01 to 0.06 grams of catalyst per gram of polyvinyl acetate.

*Examples*

The experimental procedure involved the use of a stirred 3-liter 3-necked flask, equipped with a thermometer and condenser. In each run 100 grams of anhydrous polyvinyl acetate was dissolved in 250 ml. absolute methanol. The desired amount of guanidine carbonate catalyst was dissolved in a sufficient amount of additional absolute methanol so that a final ratio of methanol to polyvinyl acetate after mixing the two solutions was 8.5:1 on a volume basis.

The two solutions were mixed and rapidly stirred at a temperature of about 25° C. for 10 to 200 minutes depending on the catalyst concentration. Thereupon, the solution rapidly began to gel, as evidenced by slower rotation of the stirrer. When gelation occurred, 300 ml. water was added. After an additional four hours of reaction time at about 25° C., the reaction was completely terminated by the addition of aqueous acetic acid. (This was for the purpose of accurately establishing the extent of hydrolysis and is unnecessary in commercial operation.)

The hydrolyzed polyvinyl acetate was precipitated in acetone and washed with acetone until free of acetic acid. The polymer was then dried in a dessicator heated by infrared lamps.

The following table presents the results of seven tests conducted in this manner at various catalyst concentrations, and illustrates the even increase in percent hydrolysis as a function of catalyst concentration:

| Gram catalyst/gram ester: | Percent Hydrolysis |
|---|---|
| 0 | [1] 70.0 |
| 0.01 | 71.5 |
| 0.02 | 71.5 |
| 0.03 | 75.5 |
| 0.04 | 78.0 |
| 0.05 | 80.5 |
| 0.06 | 82.5 |

[1] Amount of hydrolysis if the reaction is stopped by neutralization of the catalyst when the gel begins to form.

From the foregoing, it is seen that exceptional control of hydrolysis can easily be effected in accordance with the invention. In each instance, the resultant polymer was almost completely uniform and homogeneous.

If less than the indicated 70% hydrolysis is desired, a mixture of alkanols or a higher molecular weight alkanol such as ethanol or propanol may be employed. With these higher molecular weight alcohols, gelation occurs at less than 70% hydrolysis.

The results also indicate that the amount of catalyst exhibits a significant effect on the degree of hydrolysis, for any given set of reaction conditions. Increased hydrolysis may be obtained by using a higher catalyst concentration and/or decreasing the amount of water added at the gel point.

From the foregoing, it is evident that the objects of our invention have been attained, and a facile method has been provided for obtaining extremely uniform polyvinyl alcohols. While the invention has been described with reference to specific embodiments thereof, it will be understood that these are illustrative only and accordingly modifications and variations will be apparent to those skilled in the art. It is thus intended to include all such modifications and variations as fall within the spirit and broad scope of the present invention.

We claim:
1. In a process for the alkaline-catalyzed hydrolysis of a polyvinyl ester with a lower alkanol having from one to four carbon atoms per molecule, the improved procedure which comprises: commingling the polyvinyl ester, an excess of the alkanol, and a predetermined amount of alkaline hydrolysis catalyst to form a fluid reaction mixture, effecting a portion of the hydrolysis reaction in the fluid state in the substantial absence of water until the resultant polyvinyl alcohol begins to form a gel with the excess alkanol, introducing water into the reaction mixture substantially simultaneously with the onset of said gel formation to disrupt the gel and return the reaction mixture to the fluid state, and effecting additional hydrolysis reaction and controlled destruction of the catalyst with said water in the reaction mixture.

2. In a process for hydrolyzing polyvinyl acetate with a lower alkanol having from one to four carbon atoms per molecule, the improved procedure which comprises: commingling the polyvinyl acetate with an excess of the alkanol and a predetermined amount in the range of from 0.001 to 0.3 part by weight per part of polyvinyl acetate of a weakly basic alcohol-soluble hydrolysis catalyst to form a fluid reaction mixture, effecting a portion of the hydrolysis reaction to proceed at a suitable temperature in the range of about 10 to 60° C. with not more than about one weight percent, based on total reactants, of water until the resultant polyvinyl alcohol begins to form a gel with the excess alkanol, introducing from 0.1 to 15 parts of water per part of polyvinyl acetate into the reaction mixture substantially simultaneously with the onset of said gel formation to disrupt the gel and return the reaction mixture to the fluid state, and effecting additional hydrolysis reaction and controlled destruction of the catalyst while said water is in said reaction mixture until the desired degree of hydrolysis is obtained.

3. Process of claim 1 wherein alkaline hydrolysis catalyst is a weakly basic alkanol-soluble catalyst.

4. Process of claim 3 wherein said catalyst is guanidine carbonate.

5. Process of claim 1 wherein said polyvinyl ester is polyvinyl acetate.

6. Process of claim 1 wherein said lower alkanol is methanol.

7. Process of claim 2 wherein said alkanol is methanol.

8. Process of claim 2 wherein said catalyst is guanidine carbonate.

References Cited in the file of this patent

UNITED STATES PATENTS

| 2,561,458 | Bisch | July 24, 1951 |
| 2,759,914 | Kenyon et al. | Aug. 21, 1956 |

FOREIGN PATENTS

| 615,079 | Great Britain | Dec. 31, 1948 |
| 489,663 | Canada | Jan. 13, 1953 |